United States Patent
Kobayashi

[11] Patent Number: 6,121,902
[45] Date of Patent: Sep. 19, 2000

[54] OPTICAL DISC RECORDING APPARATUS, OPTICAL DISC, AND OPTICAL DISC REPRODUCING APPARATUS

[75] Inventor: Seiji Kobayashi, Kanagawa, Japan

[73] Assignee: Sony Corporation, Tokyo, Japan

[21] Appl. No.: 09/106,990

[22] Filed: Jun. 29, 1998

[30] Foreign Application Priority Data

Jun. 30, 1997 [JP] Japan .................................. 9-173811

[51] Int. Cl.[7] .................................................. H03M 7/00
[52] U.S. Cl. .................................................. 341/58; 341/69
[58] Field of Search ...................... 341/58, 59, 68, 341/69

[56] References Cited

U.S. PATENT DOCUMENTS

| | | | |
|---|---|---|---|
| 5,003,527 | 3/1991 | Matsumoto et al. | 369/100 |
| 5,177,720 | 1/1993 | Kondo | 369/32 |
| 5,638,064 | 6/1997 | Mori et al. | 341/58 |
| 5,898,394 | 4/1999 | Kobayashi et al. | 341/58 |

*Primary Examiner*—Howard L. Williams
*Attorney, Agent, or Firm*—Frommer Lawrence & Haug, LLP.; William S. Frommer

[57] ABSTRACT

A predetermined signal pattern whose length is 9 T or more (signal level="1") of a modulation signal S2 modulated by a modulating circuit corresponding to a conventional information signal is varied corresponding to an output signal SC1 of a disc identification code generating circuit. When the signal level of the output signal SC1 is "1", a signal converting circuit varies the signal level at a nearly center position of the particular signal pattern to "0" for 1 T. Thus, a pit whose length is 9 T or more is converted into two pits and one blank and recorded on a compact disc. When a reproducing operation is performed, a nearly center position of a reproduction signal of a pit whose length is 9 T or more is sampled. Corresponding to the sampled result, the disc identification code signal is decoded. Since a binary signal of the reproduction signal is not affected by the conversion, a conventional information signal is correctly reproduced.

15 Claims, 8 Drawing Sheets

OPTICAL DISC RECORDING APPARATUS, OPTICAL DISC, AND OPTICAL DISC REPRODUCING APPARATUS

BACKGROUND OF THE INVENTION

1. Field of the Invention

The present invention relates to an optical disc recording apparatus used for producing a compact disc, an optical disc such as a compact disc, and an optical disc reproducing apparatus such as a compact disc player.

2. Description of the Related Art

Conventionally, a code that represents a maker, a manufacturer, a disc number, and so forth are stamped in an area that is located in more inner than an audio signal recording area and a TOC (Table Of Contents) of a compact disc. In addition, a method of which such a code is recorded on a signal recording area as a visible pattern has been proposed.

Although such a code representing a maker, a manufacture, and so forth is visibly recognized, a compact disc reproducing apparatus cannot read the code. Thus, the content of such a code cannot be affected to the operation and control of the reproducing apparatus.

OBJECTS AND SUMMARY OF THE INVENTION

Therefore, an object of the present invention is to provide an optical disc recording apparatus that allows a disc identification code that can be read by a reproducing apparatus and that does not adversely affect a conventional information signal used by the user to be recorded to an optical disc. Another object of the present invention is to provide an optical disc on which such a disc identification code has been recorded. A further object of the present invention is to provide an optical disc reproducing apparatus that allows such a disc identification code as well as a conventional information signal to be reproduced from an optical disc.

A first aspect of the present invention is an optical disc recording apparatus for recording first record information as conventional information and second record information as additional information on a disc-shaped record medium, comprising a first modulation signal generating means for switching a signal level at intervals of a predetermined period times any integer corresponding to the first information so as to generate a first modulation signal, a pattern detecting means for sampling the first modulation signal corresponding to the predetermined period so as to detect a predetermined pattern of the first modulation signal, a second modulation signal generating means for switching a signal level corresponding to the second information so as to generate the second modulation signal, a signal converting means for changing a part of the first modulation signal corresponding to an output signal of the pattern detecting means and an output signal of the second modulation signal generating means, and a recording optical modulating means for modulating a recording optical beam corresponding to an output signal of the signal converting means.

A second aspect of the present invention is an optical disc having pits or marks as tracks for recording desired data, wherein first information is recorded by varying the length or intervals of the pits or marks, and wherein second information is recorded by dividing pits whose length is larger than a predetermined length.

A third aspect of the present invention is an optical disc reproducing apparatus for reproducing first information and second information from an optical disc, comprising a binary-converting means for converting an output signal of optical reading means into a binary signal, a clock generating means for generating a clock signal corresponding to the binary signal that is output from the binary-converting means, a first decoding means for decoding the first information corresponding to the binary signal that is output from the binary-converting means, and a second decoding means for decoding the second information corresponding to the binary signal that is output from the binary-converting means.

According to the present invention, when conventional user information is recorded, a signal pattern for forming a pit that exceeds a predetermined length is varied corresponding to a disc identification code.

Thus, the disc identification code is recorded in the area of a conventional information signal.

In addition, the disc identification code is decoded along with the conventional information signal from the area thereof.

These and other objects, features and advantages of the present invention will become more apparent in light of the following detailed description of a best mode embodiment thereof, as illustrated in the accompanying drawings.

DETAILED DESCRIPTION OF THE PREFERRED EMBODIMENTS

Next, a method for producing a compact disc according to an embodiment of the present invention will be described. A compact disc is produced by forming a reflection film, a protection film, and so forth on a disc-shaped substrate that is produced with a stamper.

The stamper is produced in the following manner. By radiating a recording laser beam on a substrate, an original disc is produced. After a developing process and an electrocasting process are performed for the original disc, a mother disc is produced. With the mother disc, the stamper is produced.

Figure 1:
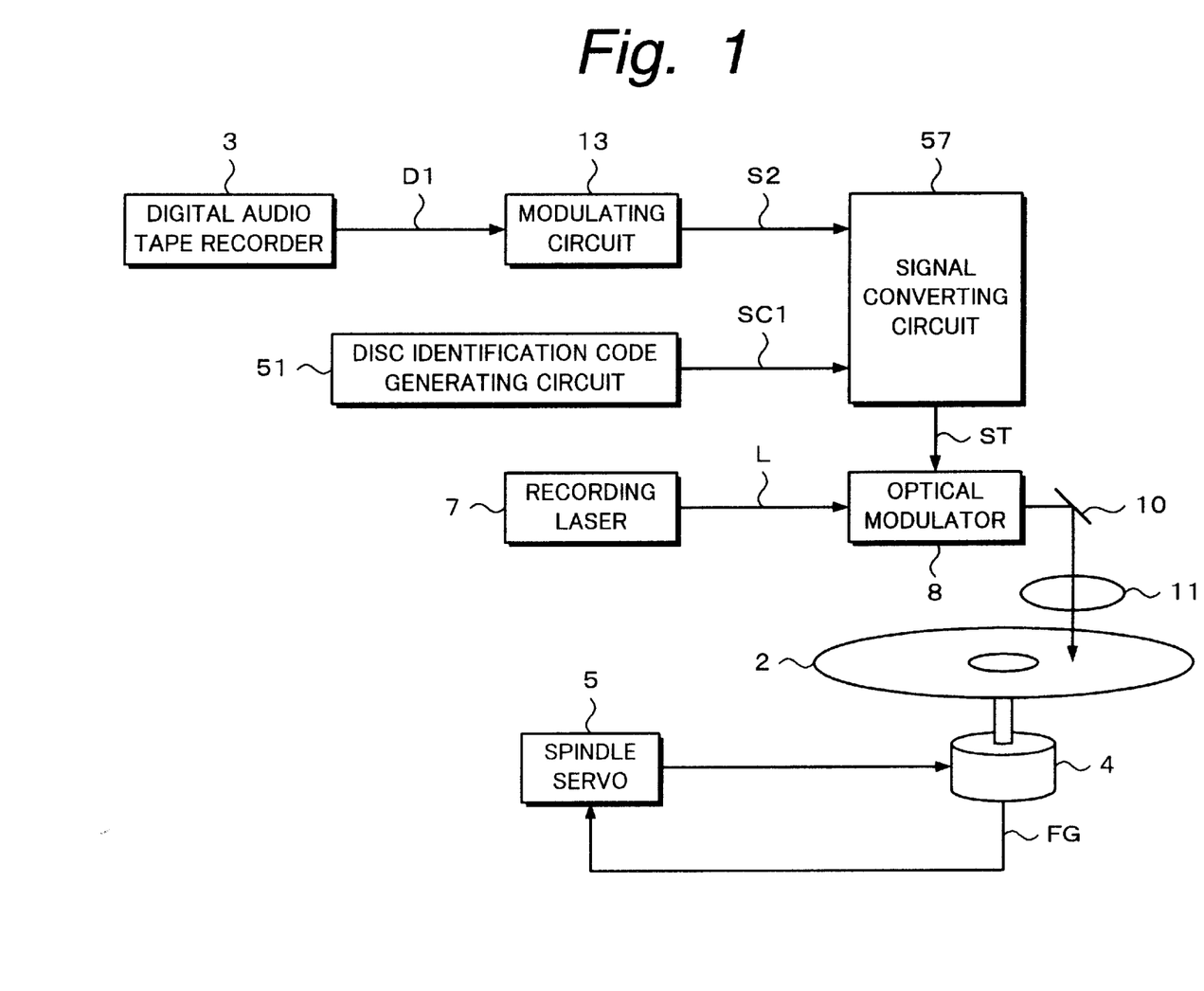
FIG. 1 is a block diagram for explaining an original compact disc producing apparatus as an optical disc recording apparatus according to an embodiment of the present invention.

Next, with reference to FIG. 1, an original compact disc producing apparatus will be described. An original disc 2 is rotated and driven by a spindle motor 4. The spindle motor 4 is controlled by a spindle servo 5.

Actually, an FG signal generator (not shown) disposed at the bottom of the spindle motor 4 outputs, an FG signal whose signal level becomes high corresponding to a predetermined rotation angle. The spindle servo 5 drives the spindle motor 4 in such a manner that a predetermined frequency of the FG signal is obtained. In such a manner, the original disc 2 is rotated and driven at a predetermined number of rotations.

On the other hand, a recording laser 7 emits a laser beam L to an optical modulator 8. The recording laser 7 is for example a gas laser. The optical modulator 8 is composed of an electric acoustic optical device or the like. The optical modulator 8 turns on/off the laser beam L received from the recording laser 7 corresponding to an EFM (Eight to Fifteen Modulation) signal S2 received from a modulating circuit 13 and emits a modulated laser beam to a mirror 10.

The mirror 10 bends the optical path of the laser beam L and emits the resultant laser beam L to the original disc 2. An objective lens 11 focuses the reflected light of the mirror 10 on a recording surface of the original disc 2. The mirror 10 and the objective lens 11 are moved in the radial direction of the original disc 2 in synchronization with the rotations thereof by a thread mechanism (not shown).

In such a manner, when the focusing position of the laser beam L is successively moved in the outer peripheral direction of the original disc 2, tracks can be helically formed on the original disc 2. Pits corresponding to the EFM signal S2 and a disc identification code signal SC1 are successively formed on the tracks.

An audio data D1 recorded on the original disc is supplied from a digital audio tape recorder 3 to the modulating circuit 13. In addition, sub-code data including TOC information and so forth corresponding to the audio data Dl is supplied from a sub-code generator (not shown) to the modulating circuit 13.

The modulating circuit 13 performs a predetermined data process for a compact disc corresponding to the received data and generates the EFM signal S2. In other words, the modulating circuit 13 adds an error correction code to the audio data D1 and the sub-code data, interleaves the resultant data, performs EFM modulating process for the resultant data, and generates the EFM signal S2. The EFM signal S2 is supplied to a signal converting circuit 57.

A disc identification code generating circuit 51 supplies the disc identification code signal SC1 to the signal converting circuit 57. The disc identification code signal SC1 includes a disc identification code composed of disc ID information, manufacturer information, production date information, and copy enable/disable control information.

The signal converting circuit 57 superimposes the EFM signal S2 with the disc identification code signal SCI and thereby generates a modulation signal ST. The signal converting circuit 57 supplies the modulation signal ST to the optical modulator 8. As will be described later, the modulation signal ST is generated in such a manner that it does not adversely affect conventional information recorded with the EFM signal S2.

When the signal level of the disc identification code signal SC1 is 0, the EFM signal S2 is output as the modulation signal ST. On the other hand, when the signal level of the disc identification code signal SC1 is 1, the length of a pit formed corresponding to the EFM signal S2 is detected. When the length of the pit formed is 9 T or more, the modulation signal ST is output in such a manner that the pit is substituted with two pits and one blank.

Figure 2:
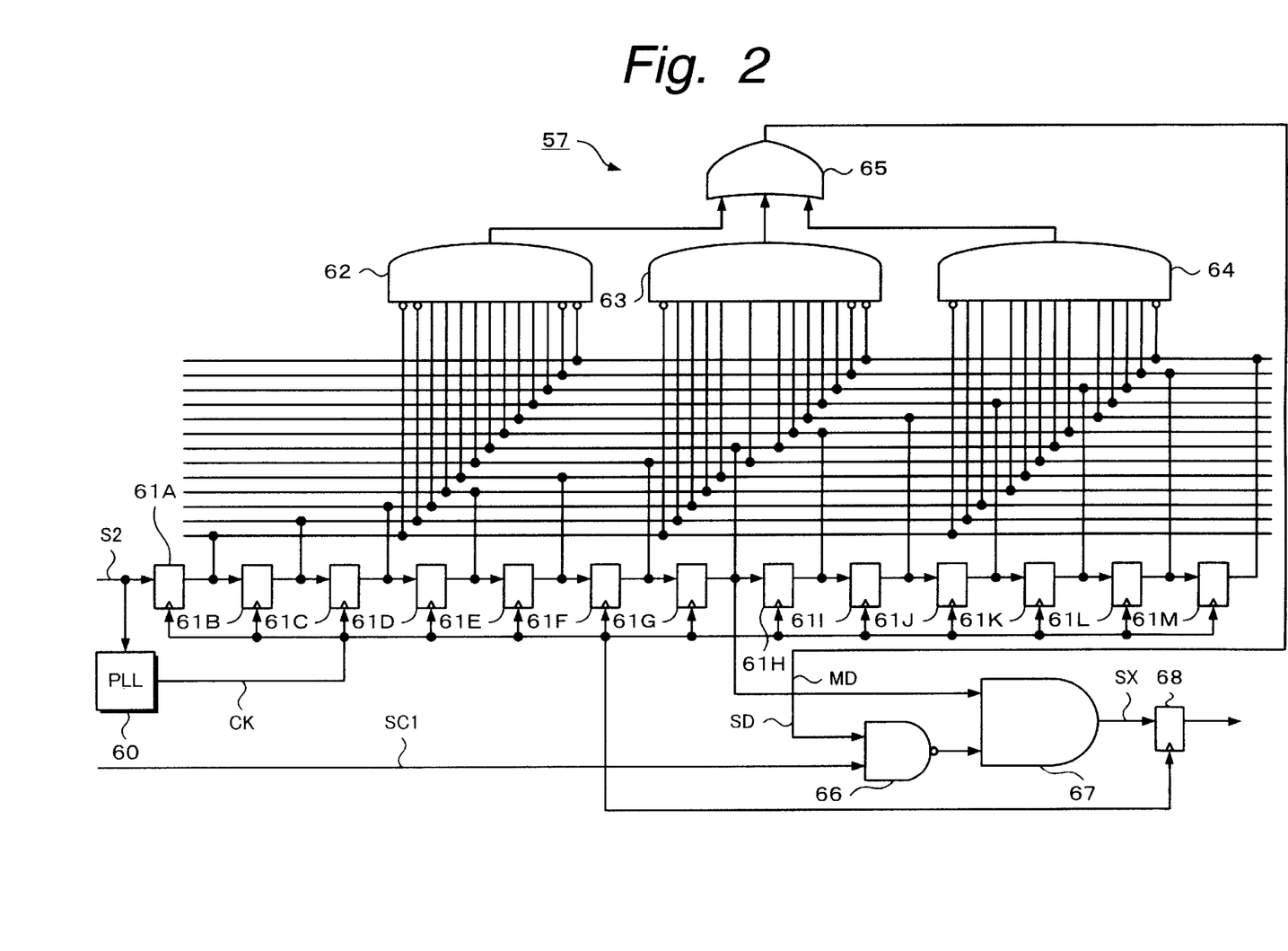
FIG. 2 is a block diagram for explaining a part of the structure of the original compact disc producing apparatus shown in FIG. 1.

Next, with reference to FIG. 2, the operation of the signal converting circuit 57 will be described. A PLL (Phase Lock Loop) portion 60 generates a clock signal CK (see FIG. 3B) that varies at intervals of the minimum variation period T of the EFM signal S2. The clock signal CK is supplied to 13 latch circuits 61A to 61M that are connected in series. The latch circuits 61A to 61M operate corresponding to the clock signal CK.

The 13 latch circuits 61A to 61M sample the EFM signal S2 corresponding to the clock signal CK. Corresponding to the sampled results of the 13 latch circuits 61A to 61M, the variation pattern of the EFM signal S2 is determined. When the sampled results are "0011111111100", a pattern for forming a pit whose length is 9 T is detected.

Output signals of the 13 latch circuits 61A to 61M are supplied to three AND gates 62, 63, and 64. Input terminals of the AND gate 62 have inverter devices corresponding to the latch circuits 61A, 61B, 61L, and 61M. Thus, when the signal levels of output signals of the latch circuits 61A to 61M are "0011111111100", the signal level of an output signal of the AND gate 62 is "1". Thus, the AND gate 62 detects a pit whose length is 9 T.

Input terminals of the AND gate 63 have inverter devices corresponding to the latch circuits 61A, 61L, and 61M. Thus, when the signal levels of output signals of the latch circuits 61A to 61M are "0111111111100", the signal level of an output signal of the AND gate 63 is "1". Thus, the AND gate 63 detects a pit whose length is 10 T.

Input terminals of the AND gate 64 have inverter devices corresponding to the latch circuits 61A and 61M. Thus, when the signal levels of output signals of the latch circuits 61A to 61M are "0111111111110", the signal levels of an output signal of the AND gate 64 is "1". Thus, the AND gate 64 detects a pit whose length is 11 T.

The output signals of the AND gates 62, 63, and 64 are supplied to an OR gate 65. When the signal level of one of the output signals of the AND gates 62, 63, and 64 is "1", the OR gate 65 outputs a pit detection signal MD to an NAND gate 66. The signal level of the pit detection signal MD become 1 when a pit whose length is 9 T or more is formed in the EFM modulating method.

The NAND gate 66 receives the disc identification code signal SC1 from the disc identifying circuit 51 along with the detection signal MD received from the OR gate 65. The NAND gate 66 ANDs the disc identification code signal SC1 and the detection signal MD and then inverts the signal level of the resultant signal. An output signal of the NAND circuit 66 is supplied to an AND gate 67.

Thus, when both the signal levels of the detection signal MD and the disc identification code signal SC1 are "1", the signal level of the output signal of the NAND gate 66 is "0". Otherwise, the signal level of the output signal of the NAND gate 66 is "1". In other words, a signal pattern for forming a pit whose length is 9 T or more is detected. In addition, only when the signal level of the disc identification code signal SC1 is "1", the signal level of the output signal of the NAND gate 66 is "0".

On the other hand, the seventh latch circuit 61G supplies the EFM signal SD that has a delay of seven clock pulses to the AND gate 67. The AND gate 67 ANDs the delayed EF signal SD and the output signal of the NAND gate 66 and outputs the result as an AND signal SX. The AND signal SX is supplied to a latch circuit 68. The latch circuit 68 shapes the waveform of the AND signal SX and outputs the resultant signal as the modulation signal ST that is a final output signal.

In this example, the seventh latch circuit 61G outputs the delayed EFM signal SD having a delay of seven clock pules. Alternatively, another latch circuit may output the delayed EFM signal. However, the delay time of the delayed EFM signal depends on the position of the latch circuit.

Next, the method for generating the AND signal SX will be described in detail. In the period of which the signal level of the disc identification code signal SC1 is "1", the length of a pit formed with the EFM signal S2 supplied to the signal converting circuit 57 is determined.

When the length of the pit being formed is 9 T or more, the signal level of the detection signal MD is "1". Thus, the signal level of the output signal of the NAND gate 66 is "0". Consequently, the signal level of the AND signal SX forcedly becomes "0". In the period of which the signal level of the disc identification code signal SC1 is "1", the signal pattern for forming a pit whose length is 9 T or more in the EFM signal is converted into a signal pattern for forming two pits and one blank.

On the other hand, in the period of which the signal level of the disc identification code signal SC1 is "0", since the signal level of the output signal of the NAND gate is always "1", the AND signal SX matches the delayed EFM signal SD. In other words, even if the delayed EFM signal SD has a signal pattern for forming a pit whose length is 9 T or more, no conversion is performed.

Figure 3A:
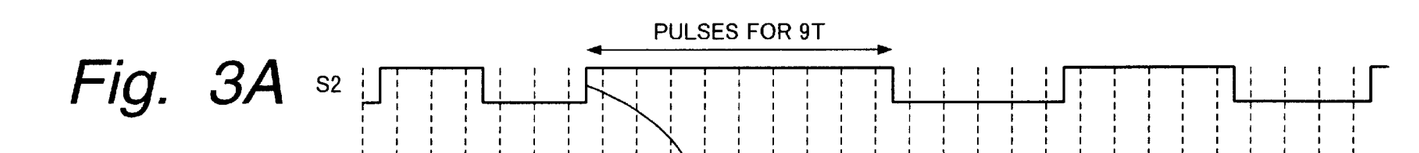
FIGS. 3A to 3F are timing charts for explaining signals generated by the original compact disc producing apparatus shown in FIG. 1.
Figures 3B, 3C, 3D:
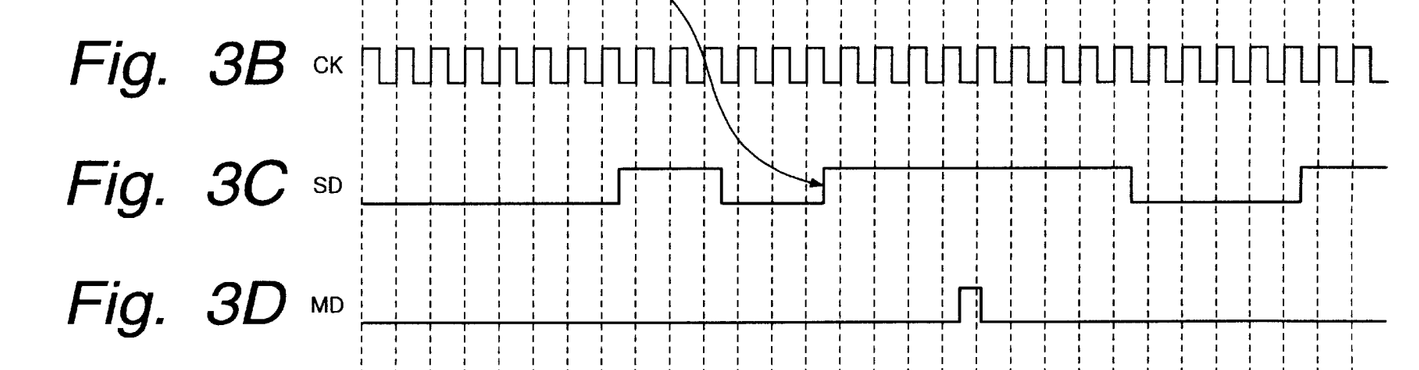

Next, the process performed in the period of which the signal level of the disc identification code signal SC1 is "1" will be practically described with reference to a timing chart shown in FIGS. 3A to 3F. FIG. 3A shows an example of the EFM signal S2 including a signal pattern for forming a pit whose length is 9 T. As will be described later, signals shown in FIGS. 3C to 3F are generated corresponding to the EFM signal S2. FIG. 3B shows the clock signal CK generated by the PLL portion 60. As described above, the latch circuits 61A to 61M and 68 operate corresponding to the clock signal CK.

FIG. 3C shows the delayed EFM signal SD. As described above, the delayed EFM signal SD is a signal of which the EFM signal S2 is delayed by seven clock pulses. FIG. 3D shows the detection signal MD. At a nearly center position of the period of which the signal level of the delayed EFM signal SD is "1" (namely, four clock pulses after the signal level of the delayed EFM signal SD becomes high), the signal level of the detection signal MD becomes "1".

Figures 3E, 3F:
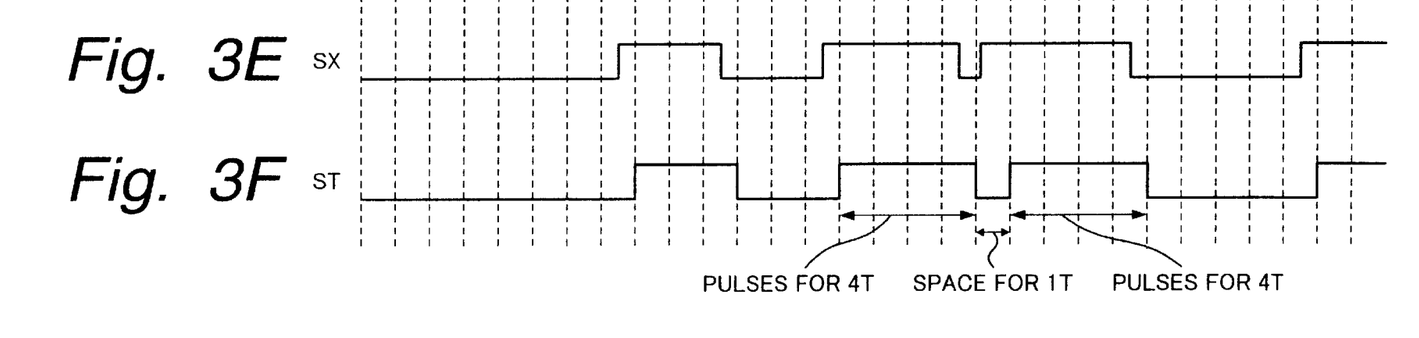

Since the signal level of the disc identification code signal SC1 is "1", in the period of which the signal level of the detection signal MD is "1", the signal level of the output signal of the NAND gate 66 is "0". Thus, in such a period, the signal level of the AND signal SX that is output from the AND gate 67 forcedly becomes "0". Thus, as shown in FIG. 3E, the AND signal SX is a signal of which a portion of which the signal level is "0" (namely, a space) is placed at a nearly center position of the signal pattern for forming a pit whose length is 9 T.

In the above example, the EFM signal S2 includes a signal pattern for forming a pit whose length is 9 T. Alternatively, when an EFM signal S2 that includes a signal pattern for forming a pit whose length is 10 T or 11 T is input, the similar process is performed. Thus, when a signal pattern for forming a pit whose length is 9 T or more is detected, the signal level of a portion whose length is 1 T at a nearly center position of the signal pattern forcedly becomes "0".

The latch circuit 68 latches the AND signal SX at intervals of each clock pulse and thereby shapes the waveform of the AND signal SX. The latch circuit 68 generates the modulation signal ST as a final output signal of the signal converting circuit 57 and supplies the modulation signal ST to the optical modulator 8. The optical modulator 8 controls the laser beam emitted by the recording laser 7 corresponding to the modulation signal ST and thereby records the modulation signal ST to the original disc 2.

Figure 4A:
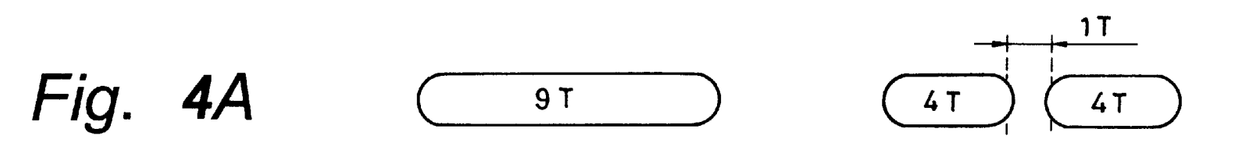
FIGS. 4A to 4D are schematic diagrams for explaining a reproducing operation of data from a compact disc as an optical disc according to an embodiment of the present invention.

To clarify the fact that the modulation signal ST does not adversely affect conventional information recorded with the EFM signal S2, with reference to FIGS. 4A to 4D, a process performed in the reproducing operation will be described. The right portion of FIG. 4A shows that a signal pattern for forming a pit whose length is 9 T is converted into a signal pattern for forming two pits whose length is 4T and a blank whose length is 1 T in the period of which the signal level of the disc identification code signal SC1 is "1". On the other hand, the left portion of FIG. 4A shows a pit whose length is 9 T in the case that such a signal pattern is not converted.

Figure 4B:
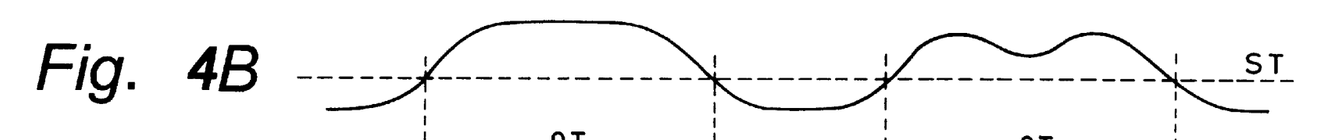

FIG. 4B shows reproduction RF signals that are reproduced from the signal patterns shown in the left portion and right portion of FIG. 4A. In FIG. 4B, in the signal pattern for forming two pits and one blank, the signal level of the reproduction signal in the period of the blank decreases. However, due to the reading characteristic of the reading optical system or the signal waveforms reproduced from the two pits that sandwiches the blank, the signal level exceeds a threshold level SH of a binary-converting circuit 154 of the reproducing apparatus.

Figure 4C:
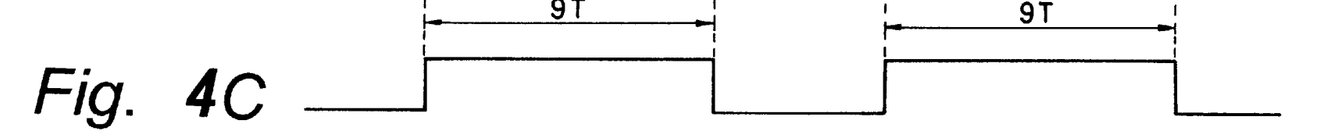

Thus, when the signal reproduced from the two pits whose length is 4 T and one blank whose length is 1 T is converted into a binary signal corresponding to the threshold level SHT, as shown in FIG. 4C, the binary signal is the same as the signal reproduced from the pit whose length is 9 T. Thus, even if a pit whose length is 9 T is varied and recorded, conventional information that is recorded with the EFM signal S2 is not adversely affected, but correctly reproduced. Alternatively, in the case that a pit whose length is 10 T or 11 T is varied and recorded, conventional information can be correctly reproduced.

Due to the characteristic of the EFM modulation, the intervals of pits formed with the EFM modulation signal S2 are 3 T or more. The signal level of the region between each pit is securely decreased to the threshold level SHT or less. Thus, even if a pit whose length is 9 T or more is divided into two portions and one black is placed therebetween, the probability of which the data of the EFM modulation signal S2 is improperly read is very low.

Figure 4D:
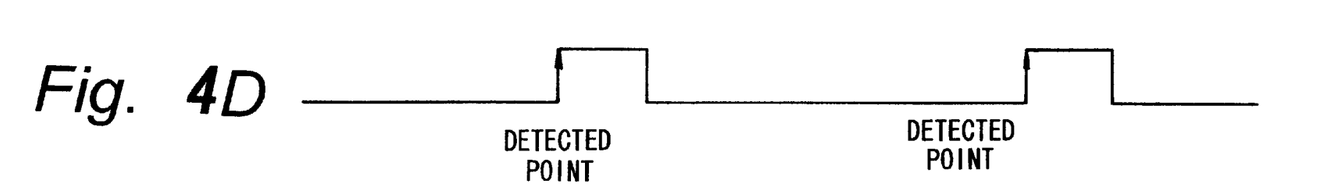

When the reproduction signal shown in FIG. 4B is sampled as shown in FIG. 4D, the disc identification code signal SC1 received from the disc identification code generating circuit 51 can be reproduced. Thus, the signal converting circuit 57 can superimpose the EFM signal S2 with the disc identification code signal SC1.

Figure 5:
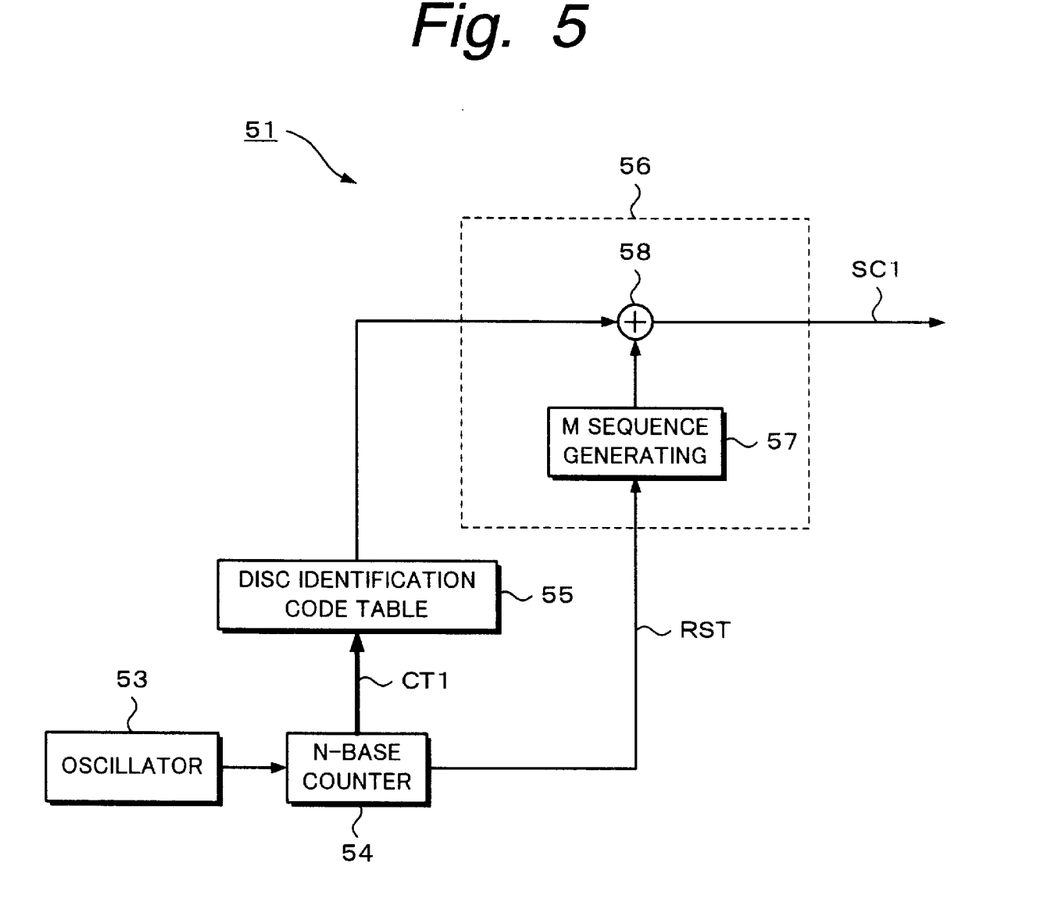
FIG. 5 is a block diagram for explaining another part of the structure of the original compact disc producing apparatus shown in FIG. 1.

Next, the operation of the disc identification code generating circuit 51 will be described. The disc identification code generating circuit 51 is accomplished with the structure shown in FIG. 5. In FIG. 5, as an N-base counter 54, a ring counter is used. The N-base counter 54 counts a signal with a particular frequency generated by an oscillator 53 and outputs a count value CT1 to a disc identification code table 55. When the count value of the N-base counter 54 becomes the maximum value thereof, it outputs a reset signal RST to an M sequence generating circuit 57.

The disc identification code table 55 is composed of a read-only memory circuit that stores bit information. The disc identification code table 55 outputs data corresponding to the count value CT1 as an address value. Bit information corresponding to the output data of the disc identification code table 55 is particular pattern information (for example, a pattern whose length is 11 T) used as a frame synchronization signal, unique ID information of an original disc, and so forth.

The output data of the disc identification code table 55 is supplied to a scrambling circuit 56. The scrambling circuit 56 is composed of the M sequence generating circuit 57 and an exclusive-OR circuit 58. An output signal of the exclusive-OR circuit 58 is a disc identification code signal SC1. The disc identification code signal SC1 is an encrypted signal of a disc identification code. The M sequence generating circuit 57 is composed of a plurality of flip-flips and an exclusive-OR circuit.

The exclusive-OR circuit 58 receives the output signal of the disc identification code table 55 and the output signal of the M sequence generating circuit 57. When the signal level of the output signal of the M sequence generating circuit 57 is "1", the signal level of the output signal of the disc identification code table 55 is inverted. Otherwise, the output signal of the disc identification code table 55 is output as it is.

However, in the period of which the disc identification code table outputs a synchronization signal, the signal level of the reset signal RST is "1". The signal level of the output signal of the M sequence generating circuit 57 is fixed to "0". Thus, the M sequence generating circuit 57 prevents the synchronization signal from being scrambled.

Figure 6:
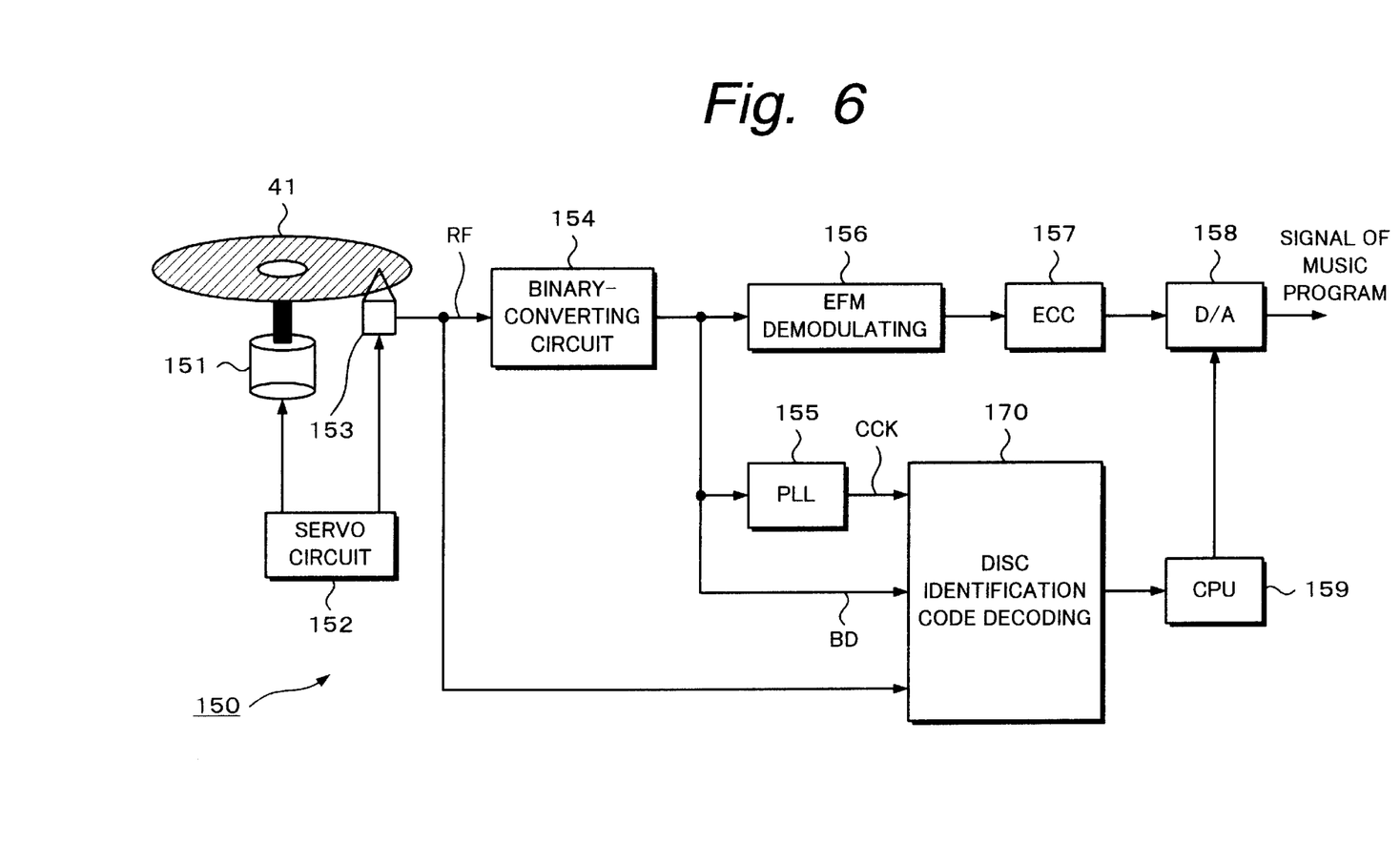
FIG. 6 is a schematic diagram for explaining a compact disc reproducing apparatus as an optical disc reproducing apparatus according to an embodiment of the present invention.

Next, with reference to FIG. 6, the operation of the reproducing apparatus 150 that reproduces data from a compact disc 41 on which a disc identification code as a superimposed signal has been recorded will be described. The compact disc 41 is rotated by a spindle motor 151. The spindle motor 151 and an optical pickup 153 are controlled by a servo circuit 152. A reproduction RF signal generated by the optical pickup 153 is supplied to a binary-converting circuit 154 and a disc identification code decoding circuit 170.

The binary-converting circuit 154 converts the received reproduction RF signal into a binary signal BD. The binary signal BD is supplied to an EFM demodulating circuit 156, a PLL portion 155, and a disc identification code decoding circuit 170. The EFM demodulating circuit 156 demodulates the binary signal BD, generates an eight-bit signal, and supplies the eight-bit signal to an ECC circuit 157.

The ECC circuit 157 corrects an error of the output signal of the EFM demodulating circuit 156 corresponding to ECC (Error Correcting Code) added in the encoding process of the recording operation. Such an error is caused by for example a defect on the compact disc 41.

The PLL portion 155 generates a channel clock signal CCK corresponding to the received binary signal BD. The generated channel clock signal CCK is supplied to the EFM demodulating circuit 156 and the disc identification code demodulating circuit 170 so that they operate corresponding to the channel clock signal CCK.

On the other hand, the disc identification code generating circuit 170 decodes the disc identification code corresponding to the three received signals that are the channel clock signal CCK, the binary signal BD, and the reproduction RF signal RF. The decoded disc identification code is supplied to a CPU (microcomputer) 159. The CPU 159 restricts the operation of the reproducing apparatus 150 corresponding to the disc identification code. For example, the CPU 159 controls an enable terminal of the D/A converter 158 so as to stop reproducing a signal of a music program.

Figure 7:
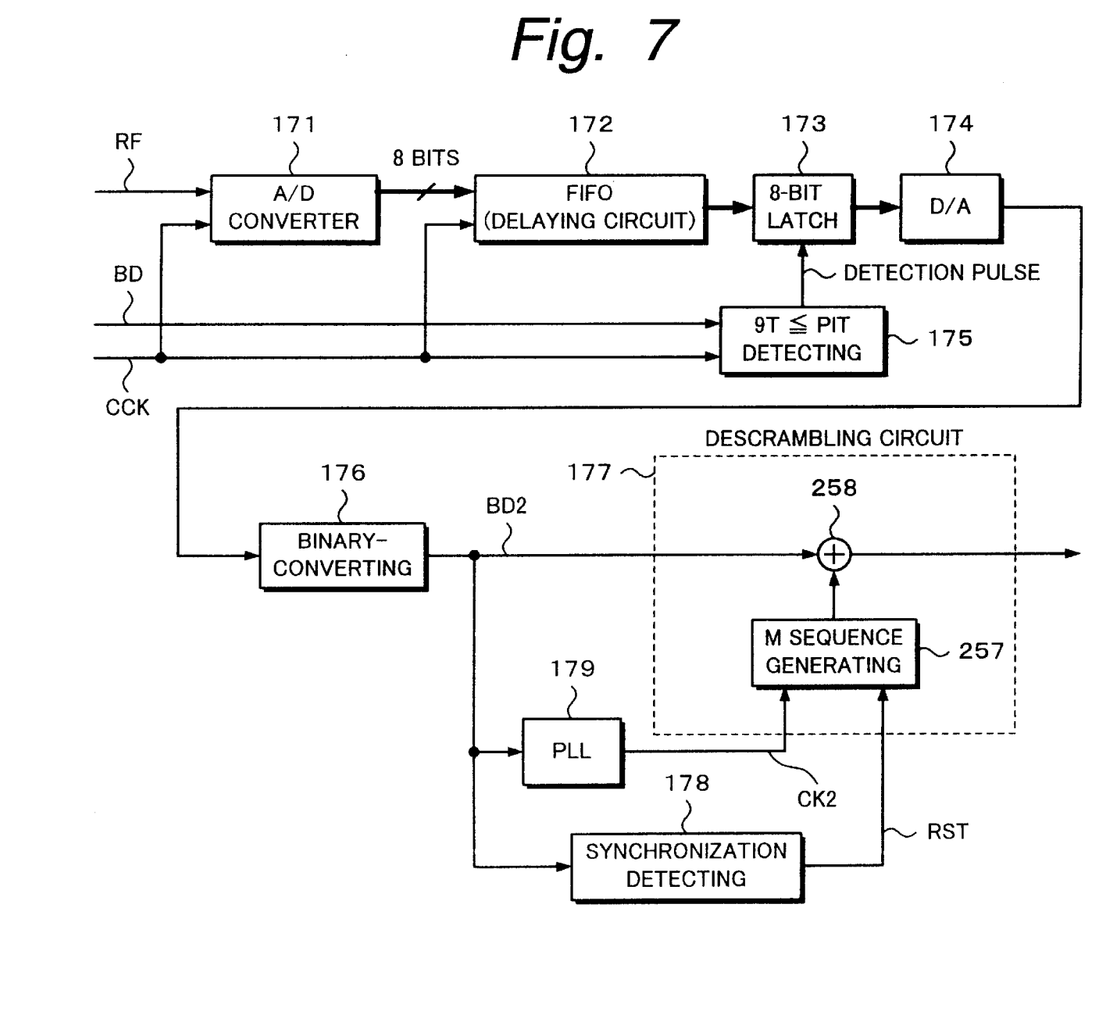
FIG. 7 is a block diagram for explaining a part of the structure of the compact disc reproducing apparatus shown in FIG. 6.

Next, with reference to FIG. 7, the operation of the disc identification code decoding circuit 170 will be described. The reproduction RF signal and the channel clock signal CCK are supplied to an A/D converter 171. The A/D converter 171 converts the reproduction RF signal into an eight-bit digital signal and supplies the resultant signal to a delaying circuit 172. The delaying circuit 172 is composed of for example an FIFO (First In First Out) memory. The delaying circuit 172 delays the received signal by a predetermined time period and supplies the resultant signal to an eight-bit latch circuit 173.

On the other hand, the binary signal BD and the channel clock signal CCK are supplied to a circuit 175 that detects a pit whose length is 9 T or more. The circuit 175 is referred to as 9 T≦pit detecting circuit. When the 9 T≦pit detecting circuit 175 has detected a reproduction RF signal from a pit whose length is 9 T or more, it generates a detection pulse.

The delay amount of the delaying circuit 172 is designated so that the timing of the detection pulse of the 9 T≦pit detecting circuit 175 matches the timing of the reproduction signal corresponding to a nearly center position of a pit. The eight-bit latch circuit 173 disposed just downstream of the delaying circuit 172 latches the output signal of the FIFO 172 corresponding to the detection pulse received from the 9 T≦pit detecting circuit 175.

Thus, the eight-bit latch circuit 173 latches the reproduction signal corresponding to a nearly center position of a pit whose length is 9 T or more. As shown in FIGS. 4B and 4D, the signal corresponding to the nearly center position of a pit whose length is 9 T or more is affected by a signal recorded as the disc identification code. Thus, the output signal of the eight-bit latch circuit 173 varies corresponding to the disc identification code. An output signal of the eight-bit latch circuit 173 is supplied to a D/A converter 74. The D/A converter 74 converts the output signal of the eight-bit latch circuit 173 as a digital signal into an analog signal.

An output signal of the D/A converter 74 is supplied to a binary-converting circuit 76. The binary-converting circuit 176 compares the received signal with a predetermined threshold level and generates a binary signal BD2. The binary signal DB2 is supplied to a descrambling circuit 177, a PLL circuit 179, and a synchronization detecting circuit 178.

The descrambling circuit 177 performs an encrypting process for the binary signal BD2 once again so as to decrypt the binary signal DB into the original signal. The descrambling circuit 177 is composed of for example an M sequence generating circuit 257 and an exclusive-OR circuit 258.

The synchronization detecting circuit 178 detects a synchronization pattern contained in the binary signal BD2. When the synchronization detecting circuit 178 has detected a synchronization pattern, the synchronization detecting circuit 178 outputs a reset signal RST to the M sequence generating circuit 257 and resets the internal state of the M sequence generating circuit 257.

The PLL circuit 179 generates a clock signal CK2 that varies at intervals of the minimum variation period of the binary signal BD2. The clock signal CK2 is supplied to the M sequence generating circuit 257. The M sequence generating circuit 257 operates corresponding to the clock signal CK2.

Figure 8:
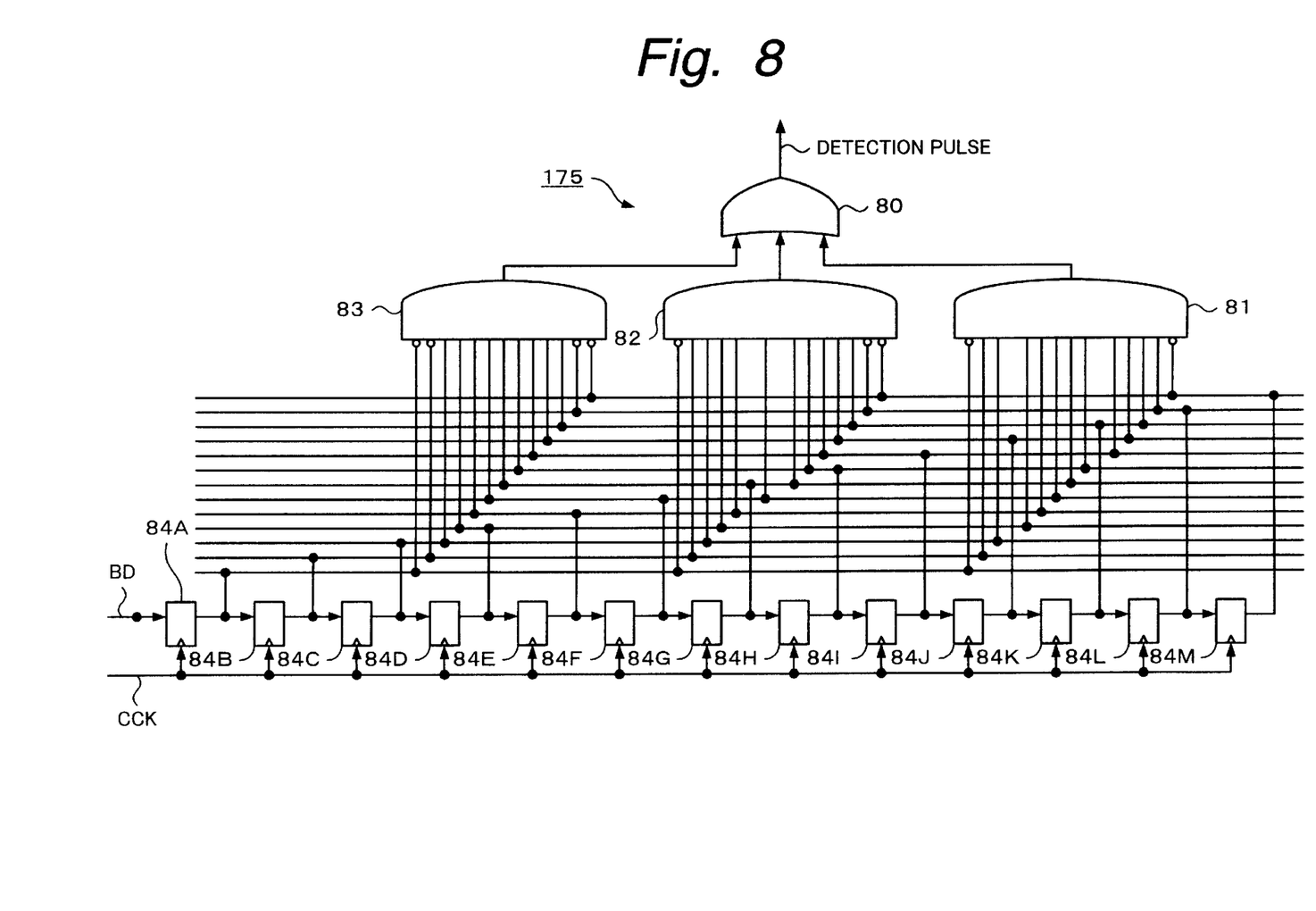
FIG. 8 is a block diagram for explaining another part of the structure of the compact disc reproducing apparatus shown in FIG. 6.

Next, with reference to FIG. 8, the operation of the 9 T≦pit detecting circuit 175 will be described in detail. A binary signal BD is input to 13 shift registers 84A to 84M. A channel clock signal CCK is supplied to the latch circuits 84A to 84M that are shift registers. Output signals of the shift registers 84A to 84M represent a pattern of binary signals sampled for each pulse of the channel clock signal CCK. Thus, corresponding to the pattern, a pit whose length is 9 T or more can be detected.

When the signal levels of the output signals of the shift registers 84A to 84M are "0011111111100", it is determined that a pit whose length is 9 T has been recorded. When the signal levels of the output signals of the shift registers 84A to 84M are "0011111111110", it is determined that a pit whose length is 10 T has been recorded. When the signal levels of the output signals of the shift registers 84A to 84M are "0111111111110", it is determined that a pit whose length is 11 T has been recorded.

In reality, a pit whose length is 9 T or more is detected by AND gates 83, 84, and 85. For example, the AND gate 83 has 13 input terminals corresponding to the latch circuits 84A to 84M. The first two terminals and the last two terminals of the AND gate 83 have respective invertor devices. Thus, when the signal levels of the output signals of the shift registers 84A to 84M are "0011111111100", the signal level of the output signal of the AND gate 83 becomes "1". Otherwise, the signal level of the output signal of the AND gate 83 becomes "0". Thus, the AND gate 83 can detect a pit whose length is 9 T.

Likewise, when the signal levels of the output signals of the shift registers 84A to 84M are "0111111111100", the signal level of the output signal of the AND gate 84 becomes "1". When the signal levels of the output signals of the shift registers 84A to 84M are "0111111111110", the signal level of the output signal of the AND gate 85 becomes "1". Thus, the AND gate 84 can detect a pit whose length is 10 T. Likewise, the AND gate 85 can detect a pit whose length is 11 T.

In the above-described structure, the descrambling circuit 177 decodes a disc identification code that has been superimposed with conventional information. The decoded disc identification code is supplied to the CPU 159. The CPU 159 restricts the operation of the reproducing apparatus 150 corresponding to the disc identification code. In such a manner, the CPU 159 determines whether or not an optical disc mounted on the reproducing apparatus 150 is a forged disc. Corresponding to the determined result, the CPU 159 can restrict the operation of the reproducing apparatus.

In the above-described embodiment, a blank is placed in a pit whose length exceeds a predetermined period. Thus, the disc identification code is superimposed with the conventional information signal. Alternatively, additional information as user information may be superimposed with the conventional information signal.

In the above-described embodiment, the EFM signal is sampled every 13 pulses of the channel clock signal. The variation pattern of the EFM signal is detected corresponding to the sampled value. Alternatively, the number of pulses of the channel clock signal to be sampled may be increased. In this case, the present invention can be applied to a longer record information pattern.

In the above-described embodiment, a blank is placed in a pit whose length is 9 T or more. Thus, the pit is divided into two portions so as to superimpose a conventional information signal with the disc identification code. Alternatively, a pit whose length is 8 T or more may be divided into two portion so as to superimpose a conventional information signal with the disc identification code or the like.

In the above-described embodiment, a blank whose length is 1 T is placed in a pit whose length is 9 T or more so as to divide the pit into two portions. However, the length of the black is not limited to such a period as long as the blank does not adversely affect a conventional information signal. For example, when the conventional information signal is an EFM signal, since the minimum inversion period is 3 T, the length of the blank may be less than 3 T (for example, 2 T).

In the above-described embodiment, a pit whose length is 9 T or more is divided into two portions so as to superimpose a conventional information signal with a disc identification code. Alternatively, a blank whose length is 9 T or more may be divided into two portions so as to superimpose a conventional information signal with a disc identification code or the like.

In the above-described embodiment, when a pit whose length exceeds a predetermined period is divided, a blank placed is placed at a nearly center position of the pit. Alternatively, the blank may be placed at a non-center position of the pit. In this case, so as to prevent a conventional information signal from being adversely affected, the lengths of the two divided portions should be the minimum inversion period or more. In addition, to allow a superimposed disc identification code or the like to be correctly decoded, a detection pulse for detecting the blank should correspond to the position of the blank.

In addition, the present invention can be applied to other modulating methods such as RLL (1, 7) modulating method (used for magneto-optic discs (MO)) and 8-16 modulating method (used for DVDs (Digital Video Discs)).

In addition, the present invention can be applied to an optical disc, an optical disc recording apparatus that records data thereto, and an optical disc reproducing apparatus that reproduces data therefrom. In other words, the present invention can be applied to for example rewritable discs (such as a magneto-optic disc (MO), a phase change type disc PD, and a CD-E (CD-Erasable)), once-writable discs (such as a CD-R), and read-only optical discs (such as a CD-ROM and a DVD) as well as compact discs. Moreover, the present invention can be applied to a recording apparatus and/or a reproducing apparatus that records and/or reproduces data to/from such a disc.

According to the present invention, a modulation signal is generated corresponding to a conventional information signal that has been modulated by for example EFM modulating method and a variation pattern of a disc identification code or the like (such as ID information of an original disc). The modulation signal is recorded. Thus, the disc identification code or the like can be superimposed with the conventional information signal.

In addition, since the optical disc reproducing apparatus according to the present invention has both a reproducing system that reproduces a conventional information signal and a reproducing system that reproduces a disc identification code superimposed therewith, the optical disc reproducing apparatus can reproduce the disc identification code or the like along with the conventional information signal.

Thus, when the apparatus performs a reproducing operation, the apparatus can determine whether a disc identification code has been correctly recorded. Corresponding to the determined result, the apparatus can determine whether or not the disc mounted therein is a forged disc. In addition, according to the determined result, the apparatus can restrict the operation thereof.

As a disc identification code or the like, additional information other than a conventional information signal can be recorded.

In addition, before a disc identification code is recorded, it is encoded by a scrambling circuit. Thus, without encoding information, the disc identification code cannot be decoded. Consequently, the disc producer can prevent a third person from forging the disc identification code.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. An optical disc recording apparatus for recording first record information as conventional information and second record information as additional information on a disc-shaped record medium, comprising:

first modulation signal generating means for switching a signal level at intervals of a predetermined period times any integer corresponding to the first information so as to generate a first modulation signal;

pattern detecting means for sampling the first modulation signal corresponding to the predetermined period so as to detect a predetermined pattern of the first modulation signal;

second modulation signal generating means for switching a signal level corresponding to the second information so as to generate the second modulation signal;

signal converting means for changing a part of the first modulation signal corresponding to an output signal of said pattern detecting means and an output signal of said second modulation signal generating means; and recording optical modulating means for modulating a recording optical beam corresponding to an output signal of said signal converting means.

2. The optical disc recording apparatus as set forth in claim 1, wherein the first modulation signal and the second modulation signal have the minimum inversion period and/or the maximum inversion period.

3. The optical disc recording apparatus as set forth in claim 1, wherein said second modulation signal generating means has encrypting means.

4. The optical disc recording apparatus as set forth in claim 1, wherein said signal converting means divides the first modulation signal when the first modulation signal has a predetermined signal level for the predetermined period or more.

5. The optical disc recording apparatus as set forth in claim 4, wherein the predetermined period is twice or more than the minimum inversion period.

6. The optical disc recording apparatus as set forth in claim 1, wherein said recording optical modulating means turns on/off a laser beam as a recording optical beam corresponding to an output signal of said signal converting means.

7. An optical disc having pits or marks as tracks for recording desired data, wherein first information is recorded by varying the length or intervals of the pits or marks, and wherein second information is recorded by dividing pits whose length is larger than a predetermined length.

8. The optical disc as set forth in claim 7, wherein the second information is recorded as encrypted information.

9. An optical disc reproducing apparatus for reproducing first information and second information from an optical disc, comprising:

binary-converting means for converting an output signal of optical reading means into a binary signal;

clock generating means for generating a clock signal corresponding to the binary signal that is output from said binary-converting means;

first decoding means for decoding the first information corresponding to the binary signal that is output from said binary-converting means; and second decoding means for decoding the second information corresponding to the binary signal that is output from said binary-converting means.

10. The optical disc reproducing apparatus as set forth in claim 9, wherein said second decoding means has decrypting means for decrypting the second information that has been encrypted when the second information has been recorded.

11. The optical disc reproducing apparatus as set forth in claim 9, wherein said second decoding means has:

sampling means for sampling a particular portion of the binary signal that is output from said binary-converting means when the binary signal has a predetermined signal level for a predetermined period or more; and second binary-converting means for converting an output signal of said sampling means into a binary signal.

12. The optical disc reproducing apparatus as set forth in claim 9, further comprising:

means for controlling the operation of the apparatus corresponding to the second information that has been decoded.

13. The optical disc recording apparatus as set forth in claim 1, wherein the second information includes disc identification information.

14. The optical disc as set forth in claim 7, wherein the second information includes disc identification information.

15. The optical disc reproducing apparatus as set forth in claim 9, wherein the second information includes disc identification information.

* * * * *